United States Patent

[11] 3,592,229

| [72] | Inventor | Alfred M. Moen<br>25 Lakeview Drive, Grafton, Ohio 44044 |
|---|---|---|
| [21] | Appl. No. | 875,042 |
| [22] | Filed | Nov. 10, 1969 |
| [45] | Patented | July 13, 1971 |

[54] OPERATING STRUCTURE FOR A TWO-WAY SINGLE HANDLE MIXING FAUCET
22 Claims, 14 Drawing Figs.

[52] U.S. Cl. ............................................. 137/625.17
[51] Int. Cl. ............................................. F16k 11/02
[50] Field of Search............................................. 137/625.17,
625.4, 625; 251/288, 287, 286, 235, 284

[56] References Cited
UNITED STATES PATENTS

| 3,168,109 | 2/1965 | Klinger | 137/625.17 X |
| 3,211,180 | 10/1965 | Fraser | 137/625.17 |
| 3,287,985 | 11/1966 | Moen | 137/625.17 X |
| 3,459,223 | 8/1969 | Katva | 137/625.17 |
| 3,460,571 | 8/1969 | Moen | 137/625.17 |

Primary Examiner—M. Cary Nelson
Assistant Examiner—R. B. Rothman
Attorney—Parker, Carter & Markey ABSTRACT: A single handle mixing faucet having a body member and an external sleeve. The body member includes hot and cold water passages which terminate in ports on the body member exterior. There is an outlet passage in the body member. The sleeve includes a mixing chamber and is reciprocal and rotatable on the body member to selectively control communication between the hot and cold water ports, the mixing chamber and the outlet passage. There are means extending upwardly from the body member interconnecting the sleeve and body member to prevent removal of the sleeve but yet provide for limited relative rotation and reciprocal movement between the two members.

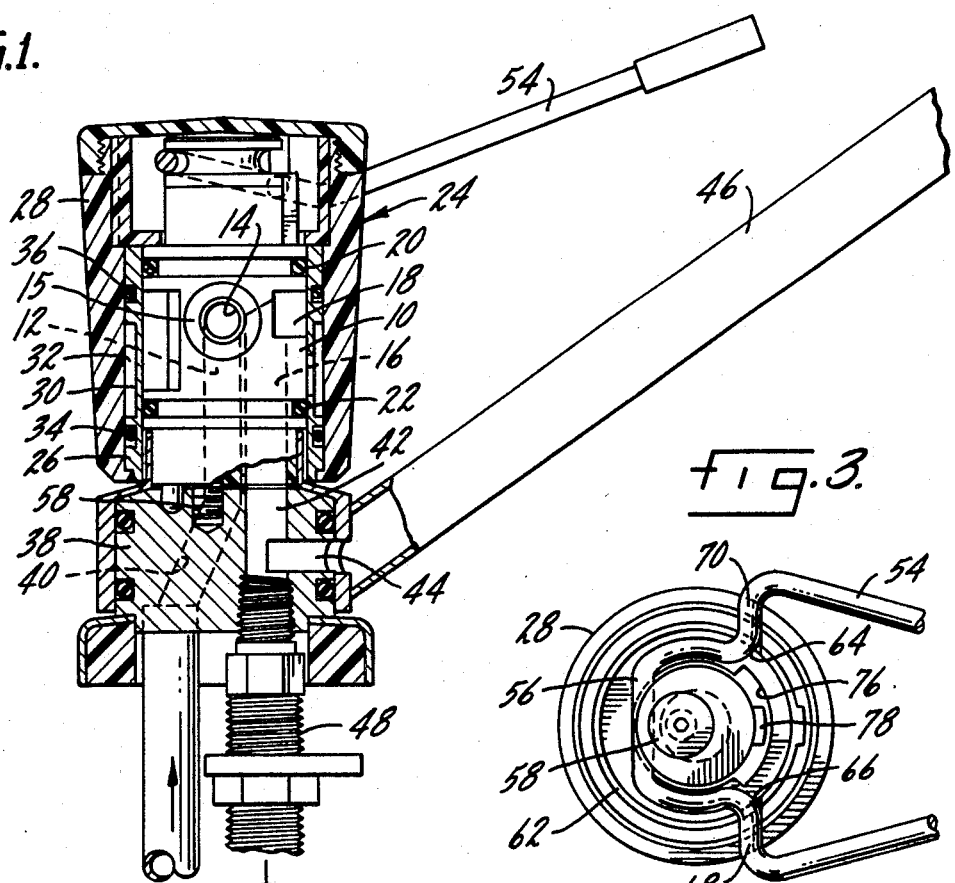

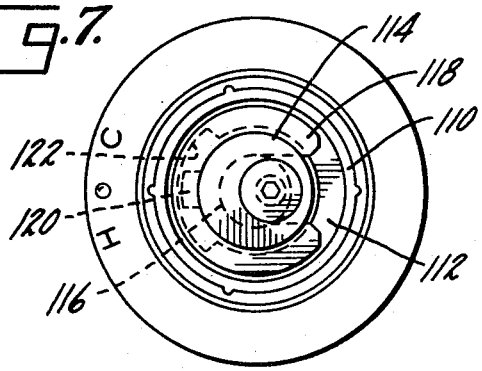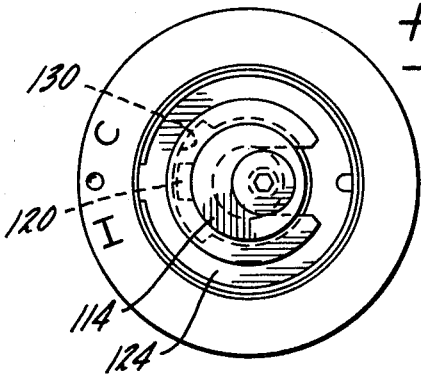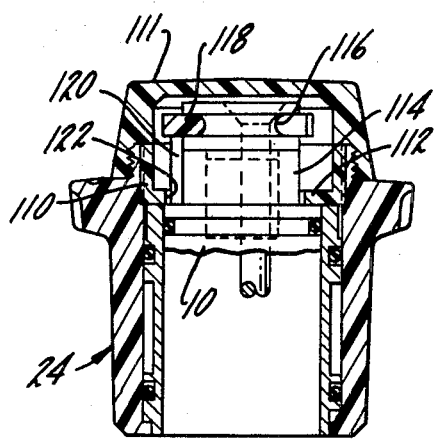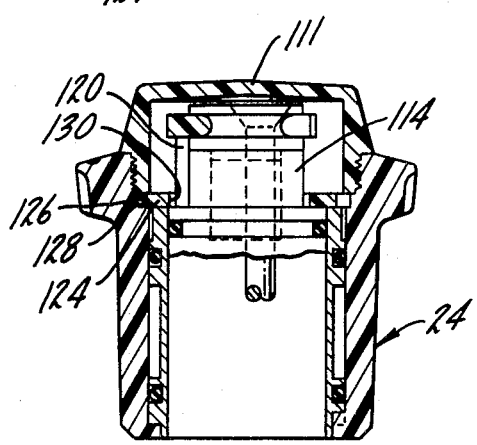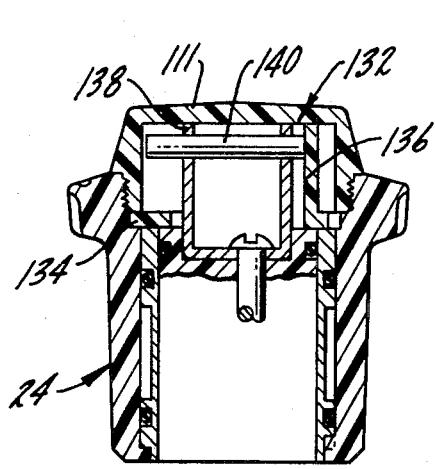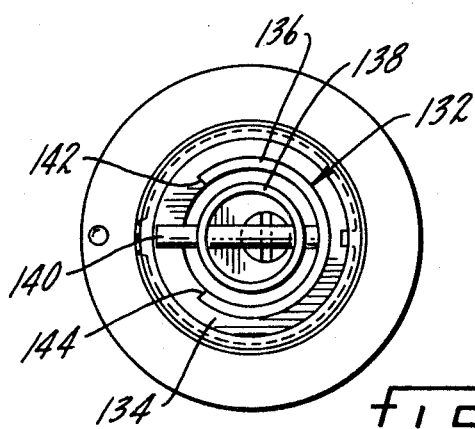

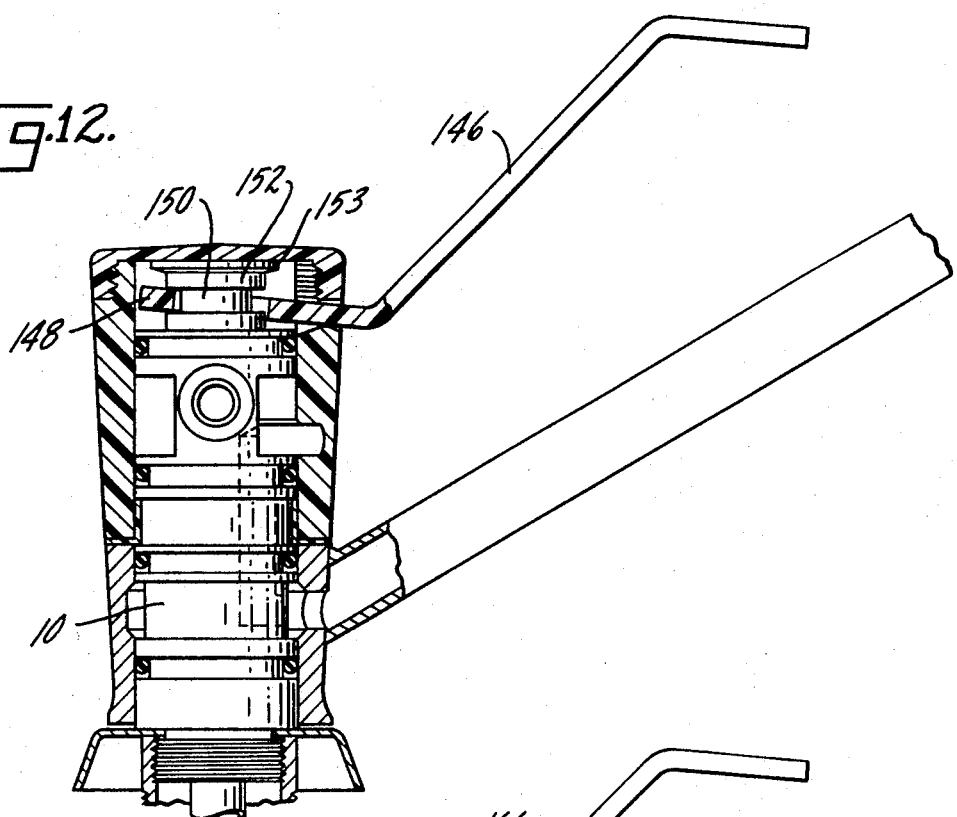
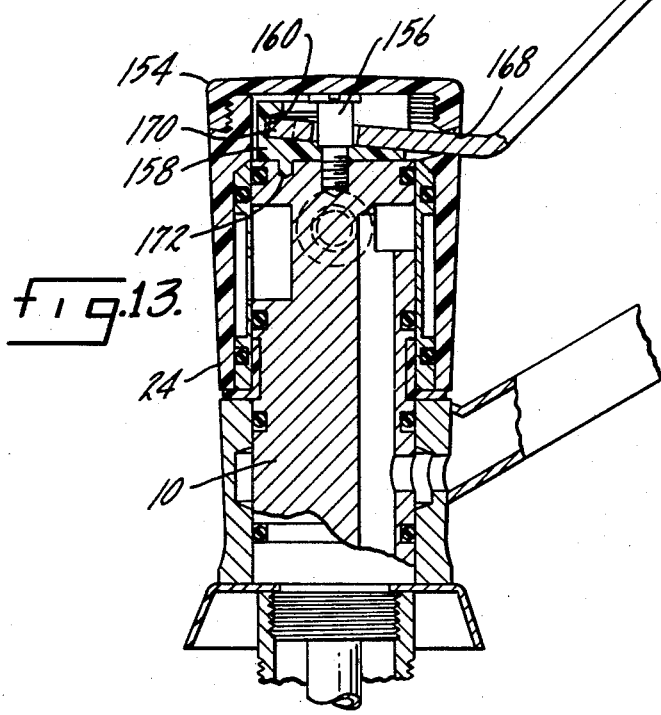
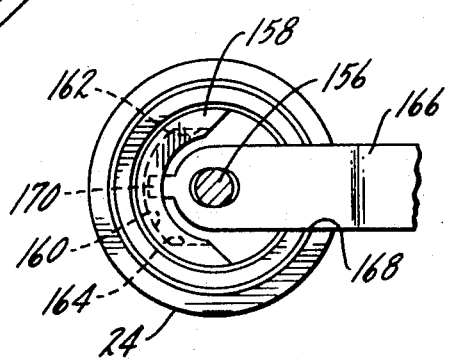

OPERATING STRUCTURE FOR A TWO-WAY SINGLE HANDLE MIXING FAUCET

SUMMARY OF THE INVENTION

The present invention relates to an improved handle mounting construction for a single handle mixing faucet of the type shown in my U.S. Pat. No. 3,460,571.

A primary purpose of the present invention is a simply constructed reliably operable handle mounting means for a single handle faucet.

Another purpose is a handle construction of the type described which permits relative rotation between the sleeve and the body member, but prevents the sleeve from being removed from the body member.

Another purpose is a single handle mixing faucet construction of the type described providing for simplified assembly of the valve.

Another purpose is an improved single handle mixing faucet including a handle mounting construction adapted for use with either a lever or a knob.

Other purposes will appear in the ensuing specification, drawings and claims.

BRIEF DESCRIPTION OF THE DRAWINGS

The invention is illustrated diagrammatically in the following drawings wherein:

FIG. 1 is a side elevation, in part section, of a single handle mixing faucet of the type described, FIG. 2 is a partial axial section through a portion of the mixing faucet of FIG. 1, FIG. 3 is a top plan view of the structure of FIG. 2 with the top cap removed, FIG. 4 is a partial axial section, similar to FIG. 2, but of a modified form of single handle mixing faucet, FIG. 5 is a top plan view of the structure of FIG. 4 with the top cap removed, FIG. 6 is a partial axial section of still a further form of a single handle mixing faucet, FIG. 7 is a top plan view of the structure of FIG. 6 with the top cap removed, FIG. 8 is a partial axial section, similar to FIG. 6, showing a modified form of handle mounting construction, FIG. 9 is a top plan view of the structure of FIG. 8 with the top cap removed, FIG. 10 is a partial axial section, similar to FIGS. 6 and 8, but showing a modified form of the invention, FIG. 11 is a top plan view of the structure of FIG. 10 with the top cap removed, FIG. 12 is a partial vertical section, similar to FIG. 1, but showing yet a further form of the invention, FIG. 13 is a partial vertical section, similar to FIG. 12, showing a modified form of the invention, and FIG. 14 is a top plan view of the structure of FIG. 13 with the top cap removed.

DESCRIPTION OF THE PREFERRED EMBODIMENT

The single handle mixing faucet of FIGS. 1, 2 and 3 includes a valve body 10 having hot and cold water inlet passages, one of which is indicated at 12. The passage 12 terminates on the exterior of the body member in a port 14 which may be surrounded by a seal ring 15. A similar port will be positioned on the opposite side of the valve. An outlet or discharge passage is indicated at 16 and is in communication with a slot or groove 18 on the body member. Seals 20 and 22 positioned at opposite ends of the body member are effective to prevent water seepage out of the faucet structure.

A sleeve or handle structure 24 may include an inner sleeve 26 and an outer sleeve or handle 28. The inner sleeve 26 may have an annular groove 30 which cooperates with the interior surface of the sleeve 28 to form a mixing chamber 32. Seals 34 and 36 are effective to prevent seepage from the upper and lower ends of the mixing chamber.

The details of the above-described sleeve and body structure are illustrated in my U.S. Pat. No. 3,460,571. Selective rotation and reciprocation of the sleeve structure 24 is effective to control the passage of hot and cold water into the mixing chamber 32 and into the discharge passage 16.

Supporting the body member 10 is a pad 38 which includes hot and cold water passages, one of which is indicated at 40, for conveying water to the body member. A discharge passage or conduit 42 is in alignment with the outlet 16 and connects with a passage 44 which directs water to the spout 46. A passage 48 also connects to the discharge conduit 42 and is effective to direct water to an auxiliary spray or similar device.

Turning particularly to FIGS. 2 and 3, a cylindrical projection 50 extends upwardly from the body member and has an annular groove 52 adjacent its upper end. A handle 54, illustrated particularly in FIG. 3, has a somewhat straight portion 56 which is adapted to fit into one side of the groove 52. An assembly screw 58 passes through the cylindrical projection into the body member and secures the body member to the pad 38. Positioned within the cavity defined by the sleeve construction 24 and a top cap 60 which is threadedly engaged thereto, is a cup 62. There are aligned slots 64 and 66 in the cup and top cap to permit the handle to extend inside of the sleeve and cup and thus to fit within the groove 52. The closed or dow position of the handle is indicated in FIG. 2. In the up position the laterally extending portions 68 and 70 of the handle 54 which extend through the aligned grooves 64 and 66 will be moved from the lower position to the upper dotted line position indicated at 72 in FIG. 2. The handle, being secured to the body member, cannot pull the sleeve off of the body member.

The cup 62 has an in-turned flange, annular in configuration, indicated at 74. The flange 74 may have an arcuate slot 76 and there may be a key 78 on the exterior of the cylindrical portion 50 which fits within the slot 76. Thus, the combination of the key 78 and the arcuate slot 76, is effective to limit the rotational movement of the sleeve on the body member. The flange 74 and the handle 54 limit reciprocal movement in the up direction with the flange and body 10 limiting down movement.

In FIG. 2 the lower end of the outer sleeve 28 has an inturned lower flange 80 which supports the inner sleeve 26. The inner sleeve is assembled from the top and is held in position at the top by means of the cup 62.

Although the invention should not be limited to the particular form of valve construction shown, such a valve is particularly applicable to the handle mounting constructions shown and described. In the following forms of the invention the valve will not be described in detail, but it will be assumed to be of the same general construction.

In FIGS. 4 and 5 a cup 82 is mounted within the cavity defined by the body member 10, sleeve construction 24 and the top cap 60. The cup 82 may have a generally in-turned flange 84. Positioned inside of the flange 84 and secured to the body member 10 by a mounting screw 86, is a member 88 which includes an arcuate, generally upstanding wall 90 having a groove 92. Note that the wall 90 extends generally through about 180°. A handle, indicated generally at 94, has a generally central portion 96 which passes through the groove 92. The groove 92 is limited in arcuate extent by the walls 98 and 100, with these walls limiting rotational movement of the handle and sleeve construction 24 on the body member.

There are aligned grooves in the cup 82 and the top cap which are indicated at 102 and 104, which are effective to permit passage of the handle member sections 106 and 108 into the interior of the handle construction. The closed position of the faucet is illustrated in FIG. 4. The flange 84 controls reciprocation of the sleeve on the body member to thus regulate the volume of water discharged through the faucet. In the open position, the flange 84 will be positioned against handle portion 96, and in the closed position, the flange will be positioned against the top of the body 10.

In FIGS. 6 and 7 there is a cup 110 positioned within the cavity defined by the body member 10, the sleeve construction 24 and a top cap 111 which is threaded into the sleeve construction 24. The cup 110 may have an in-turned flange 112 and may surround an upwardly extending generally cylindrical projection 114. A groove 116 is formed near the top of the cylindrical projection 114 and a stop 118 may be positioned within the groove. Note particularly in FIG. 6 that the stop 116 overlies the in-turned flange 112 of the cup 110. Thus, the sleeve construction cannot be pulled off of the body member. The combination of the stop 118 and the in-turned flange 112 will limit reciprocal movement of the sleeve construction 24 on the body member 10. A key 120 extends outwardly from the cylindrical member 114 and into an arcuate slot 122 formed in the flange 112 of the cup. The slot 122 is limited in arcuate extent to thus limit the rotational movement of the handle construction on the body 10.

FIGS. 8 and 9 show a somewhat similar form of construction. However, in this case the cup has been replaced by a washer 124 which is positioned between a lower surface 126 on the top cap 111 and an upper shoulder 128 of the sleeve construction 24. The washer 124 may have an arcuate slot 130 which cooperates with the key 120 on the cylindrical portion 114. Details of the handle construction are generally the same as those in FIGS. 6 and 7. The principal difference is the replacement of the cup by the flat washer 124.

In FIGS. 10 and 11, a cup-shaped member 132 is held in position between the top cap 111 and the sleeve construction 24 and has an out-turned flange 134. The cup-shaped member 132 has an annular wall 136 which extends generally for about 270°. Positioned within the member 132 is an upstanding cylindrical member 138 which mounts a pin 140. The pin 140 is journaled in holes or the like in the cylindrical member 138 and one end of the pin is positioned against the upstanding wall 136 of the member 132. Rotation of the sleeve construction on the body member is limited by the ends 142 and 144 of the upstanding wall 136. Reciprocation of the sleeve construction on the body member is limited by contact between the pin 140 and the out-turned flange 134 of the cup-shaped member 132.

The faucet in FIG. 12, which is substantially similar to the structure of FIGS. 1, 2 and 3, eliminates the cup 62 and there is no rotational stop. The handle 146 is effective to provide complete 360° rotation of the sleeve on the body member. The handle has an inwardly directed portion 148 which fits within a groove 150 on an upstanding projection 152 on the body member. As was the case in the construction of FIGS. 1, 2 and 3, reciprocal movement of the sleeve construction on the body member is limited by the cooperation of the handle portion 148 and the top surface 153.

In FIGS. 13 and 14 the sleeve construction 24 mounts a top cap 154. A fastener 156, positioned generally on the axis of the body member, is threaded into the top of the body member and mounts a handle pivot 158. The handle pivot 158 has an arcuate groove 160 with ends 162 and 164 which limit the rotational movement of the handle 166. The handle passes through a slot 168 in the sleeve construction 24 and is loosely held by the fastener 156. A projection 170 on the handle extends within the groove 160. Reciprocal movement of the handle and sleeve construction is limited by the groove 160 and the top of the fastener 156. The handle pivot 158 may have a stub 172 which extends downwardly into a mating opening in the top of the body member 10.

Of particular importance in all forms of the invention is the simplified construction. The handle or knob is connected to the body member in a manner to provide for limited rotation and reciprocation, but will not permit complete removal of the sleeve construction during normal use. The top cap must be removed before the valve can be disassembled.

In the structures of FIGS. 1—11, the inner sleeve is assembled by inserting it from the top of the outer sleeve, a decided advantage in assembly operations.

Whereas the preferred form of the invention has been shown and described herein, it should be realized that there are many modifications, substitutions and alterations thereto within the scope of the following claims.

I claim:
1. In a single handle mixing faucet, a body member having hot and cold water passages terminating in hot and cold water ports on its exterior,
   a sleeve having a mixing chamber, said sleeve being rotatable and reciprocal on said body member to place said mixing chamber into selective communication with said hot and cold water port,
   outlet means for said faucet,
   and connecting means extending upwardly from said body member for connecting said sleeve and body member, said connecting means preventing removal of said sleeve from said body member while permitting relative rotation and reciprocation therebetween.
2. The structure of claim 1 further characterized in that said connecting means includes stops for limiting relative rotation and reciprocation between the body member and sleeve.
3. The structure of claim 2 further characterized in that said connecting means includes a cup within and movable with the sleeve, said cup being positioned to seat upon the body member in at least one position of said faucet.
4. The structure of claim 3 further characterized by a generally cylindrical projection within said cup and attached to the upper end of said body member, and a handle extending through said sleeve and cup and operably connected to said projection.
5. The structure of claim 4 further characterized in that said projection includes a groove adjacent its upper end, a portion of said handle being positioned within said groove.
6. The structure of claim 5 further characterized in that said cup includes a lower generally annular in-turned flange, a slot in said flange, and a key extending outwardly from said body member and positioned within said slot, the combination of said key and slot limiting the rotational movement of said sleeve on said body member.
7. The structure of claim 6 further characterized in that said sleeve includes an inner member and an outer member, with the exterior of the outer member forming the outside of the mixing faucet.
8. The structure of claim 3 further characterized by an upstanding projection within said cup and attached to the upper end of said body member, and a handle extending through said sleeve and cup and operably connected to said projection.
9. The structure of claim 8 further characterized in that said projection includes a groove, limited in arcuate extent, said handle having an end portion positioned within said groove, with said groove limiting the rotational movement of said sleeve on said body member.
10. The structure of claim 9 further characterized in that said handle end portion, groove and said projection limit reciprocal movement of said sleeve on said body member.
11. The structure of claim 10 further characterized in that said projection includes an upstanding wall, generally 180° in circumferential extent.
12. The structure of claim 2 further characterized in that said connecting means includes a handle pivot attached to said body member, said handle pivot having an arcuate groove, and a handle extending through said sleeve and having a portion positioned within said groove.
13. The structure of claim 12 further characterized by and including fastening means attaching said handle pivot to the body member and being generally aligned with the axis of said body member, said fastening means passing through said handle, with said groove being concentric with one side of the axis of said body member.
14. The structure of claim 13 further characterized in that said groove is limited in arcuate extent to control the rotational movement of said sleeve on said body member.
15. The structure of claim 1 further characterized in that said connecting means includes an upwardly extending grooved projection attached to said body member, and a handle extending through said sleeve and having a portion positioned within said groove, said handle and groove limiting the reciprocal movement of said sleeve relative to said body member.

16. The structure of claim 2 further characterized in that said connecting means includes a cup within said sleeve and a generally cylindrical projection on said body member within said cup.

17. The structure of claim 16 further characterized by an annular groove in an upper portion of said projection, a stop positioned within said groove, with a portion of said stop overlying a portion of said cup to limit reciprocal movement of said sleeve on said body member.

18. The structure of claim 16 further characterized in that said cup includes a generally in-turned flange, a limited arcuate slot within said flange, an outwardly extending key on said projection positioned to move within said slot and limit the rotational movement of said sleeve on said body member.

19. The structure of claim 2 further characterized in that said connecting means includes a generally cylindrical projection on said body member and positioned within said sleeve, an annular member attached to said sleeve and having an inwardly directed flange which extends about said projection, a groove in an upper portion of said projection, and a stop within said groove positioned to overly a portion of said flange to limit axial movement of the sleeve on the body member.

20. The structure of claim 19 further characterized by an arcuate slot of limited extent in said flange, and a key positioned on said projection and extending into said slot to limit rotational movement of the sleeve on the body member.

21. The structure of claim 19 further characterized in that said annular member includes a generally upright wall of limited arcuate extent, said stop extending outwardly from said projection and being positioned to contact opposite portions of said upstanding wall to limit the rotational movement of said sleeve on said body member.

22. The structure of claim 21 further characterized in that said stop includes a pin.